United States Patent [19]

Beghelli

[11] Patent Number: 5,022,627

[45] Date of Patent: Jun. 11, 1991

[54] SIGN PROJECTING FROM VERTICAL WALLS OR HORIZONTAL BEAMS

[75] Inventor: Gian Pietro Beghelli, Monteveglio, Italy

[73] Assignee: G.P.B. Beghelli S.R.L., Monteveglio, Italy

[21] Appl. No.: 450,824

[22] Filed: Dec. 14, 1989

[30] Foreign Application Priority Data

Dec. 20, 1988 [IT] Italy ................................ 3706 A/88

[51] Int. Cl.[5] ............................................ F16M 13/00

[52] U.S. Cl. ................................ 248/558; 248/288.1; 40/570

[58] Field of Search .................. 248/288.1, 558, 221.4, 248/291, 207, 221.3, 289.1, 911, 912; 40/570

[56] References Cited

U.S. PATENT DOCUMENTS 1,222,915 4/1917 Anderson ............................ 248/161
2,711,300 6/1955 Nelson ............................ 248/291 X
3,345,023 10/1967 Scott et al. ...................... 248/291 X
3,591,941 7/1971 Jaffe, Jr. ........................... 40/570 X
4,551,793 11/1985 Mellema .......................... 248/558 X
4,786,025 11/1988 Sherman ...................... 248/221.4 X
4,886,237 7/1989 Dennis ............................. 248/289.1

*Primary Examiner*—Alvin C. Chin-Shue
*Attorney, Agent, or Firm*—Herbert Dubno

[57] ABSTRACT

This invention relates to means for indication and/or illumination which can be mounted to project from vertical walls and horizontal beams consisting of a sign portion of substantially prismatic shape hinged to a supporting member adapted for attachment to a wall or beam, the sign portion of which has two diverging faces joined by a bevel portion having a flat surface lying at right angles to the bisector of the dihedral formed by the surfaces of the diverging faces, on which bevel portion are provided hinge means having an axis at right angles to the flat surface of the bevel portion. An attachment member is provided in the supporting member which can be engaged by one of the diverging faces placed in front thereof and rigidly attached thereto.

4 Claims, 2 Drawing Sheets

SIGN PROJECTING FROM VERTICAL WALLS OR HORIZONTAL BEAMS

FIELD OF THE INVENTION

This invention relates to a sign, such as a means for indication and/or illumination, which can be mounted to project from vertical walls and horizontal beams. Signs such as lamps, illuminated signs, and indicator panels need to be mounted projecting from a vertical wall, or hanging from a horizontal beam or ceiling.

BACKGROUND OF THE INVENTION

Signs of various conformations appropriate for one or in other type of mounting may be provided for this purpose, but for reasons of manufacturing standardization and of providing in greater versatility in use, it is desirable that a given sign should be capable of being mounted either on a ceiling or on a wall, while, nevertheless, retaining its correct orientation, which is essential if the sign bears writing or drawings.

OBJECT OF THE INVENTION

The object of the invention is to provide signs which can be mounted in both of the above mentioned positions, while retaining their correct orientation.

SUMMARY OF THE INVENTION

This and other objects which will appear more cleary below are all achieved by the sign according to this invention. In one embodiment the sign has a body with two faces diverging at right angles between which there lies a bevel portion with an oblique surface forming a dihedral 45° with both faces, corresponding to which the supporting member has a lateral portion provided with an oblique surface parallel and facing thereto, rotational means for attachment being present between the surfaces facing the bevel portion of the sign and the lateral portion of the supporting member perpendicular to the surfaces thereof.

The rotatable means of attachment for the sign to the supporting member are preferably free to rotate through at least 180°. The rotatable means for attachment of the sign to the supporting member can be axially hollow in order to allow the passage of electrical conductors and the like.

The attachment member borne by the supporting member which can be engaged by one of the diverging faces of the sign facing the front thereof preferably comprises screw means.

In a particularly advantageous embodiment the rotatable means for attachment of the sign to the supporting member consist of an elastic collet projecting from the oblique surface of the lateral portion of the supporting member which can be inserted to lock within a corresponding hole in the bevel portion lying between the divergent faces of the sign.

Advantageously, means comprising a pin and recess or stops surrounding the attachment collet of the member supporting the sign are also present to limit the relative rotation between the member and sign to 180°.

BRIEF DESCRIPTION OF THE DRAWINGS

The above and other objects, features and advantages become more readily apparent from the following, reference being made to the accompanying drawing in which.

SPECIFIC DESCRIPTION

Figure 1:
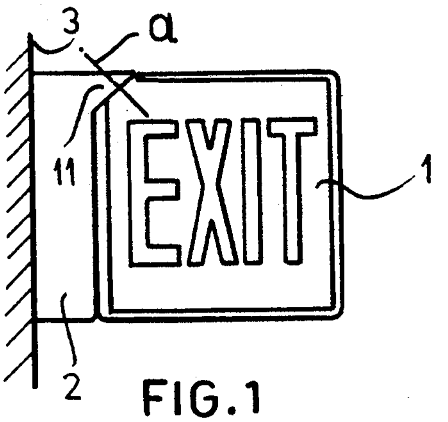
FIG. 1 is a sign assembly mounted on a vertical wall.
Figure 2:
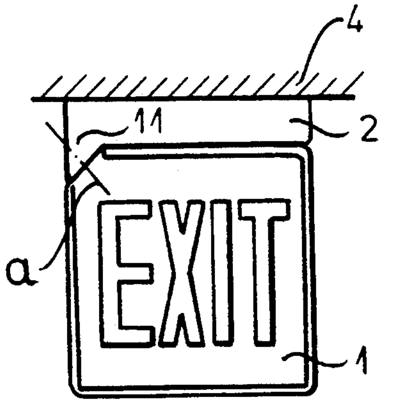
FIG. 2 is the sign assembly of FIG. 1 suspended from a ceiling.
Figure 5:
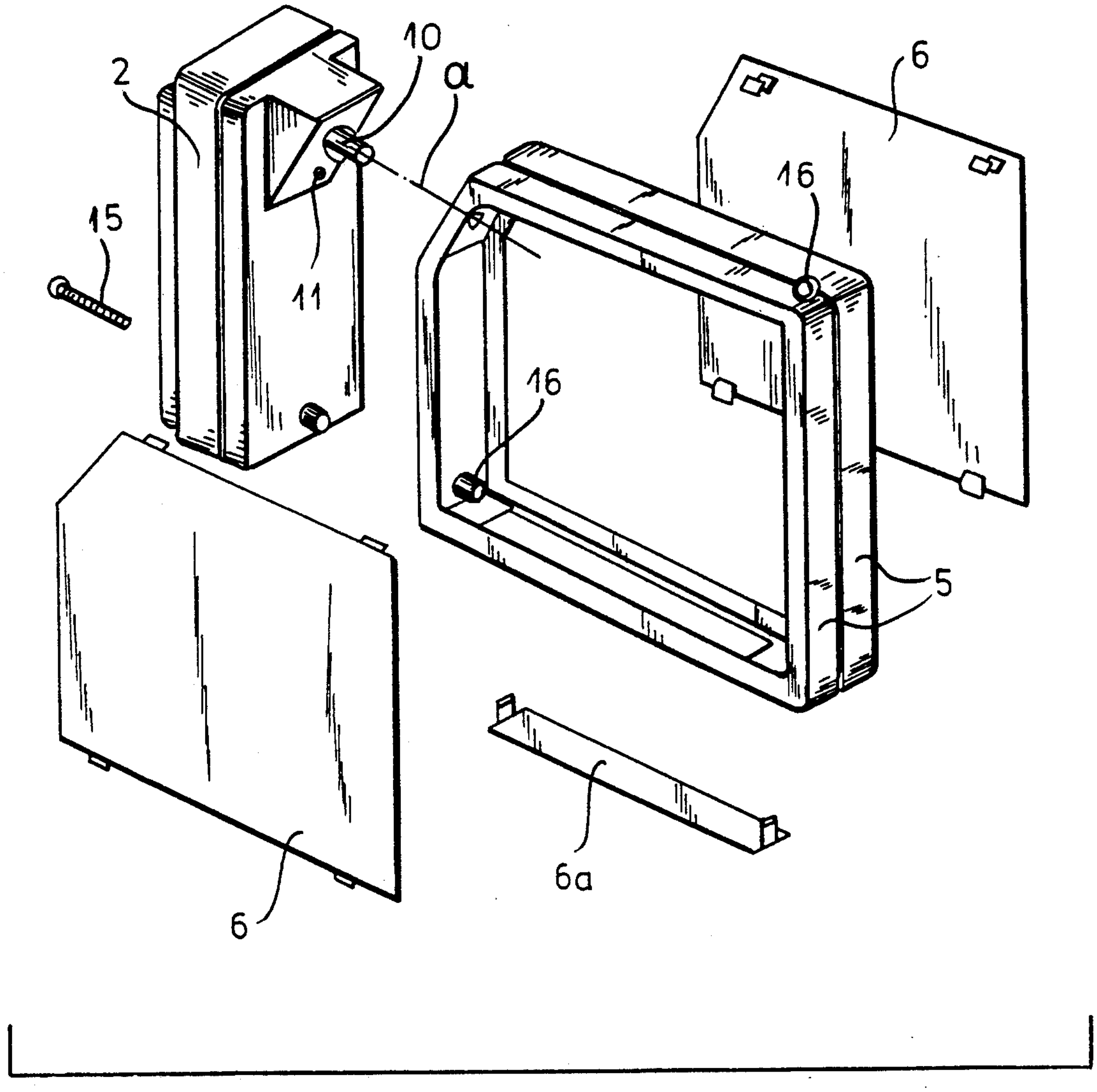
FIG. 5 is an exploded perspective view of the sign assembly.

As FIGS. 1, 2, 5 illustrate, a sign has a body 1 in the form of a lamp, attached by means of a supporting member 2 to a wall 3 or a ceiling 4.

Figure 4:
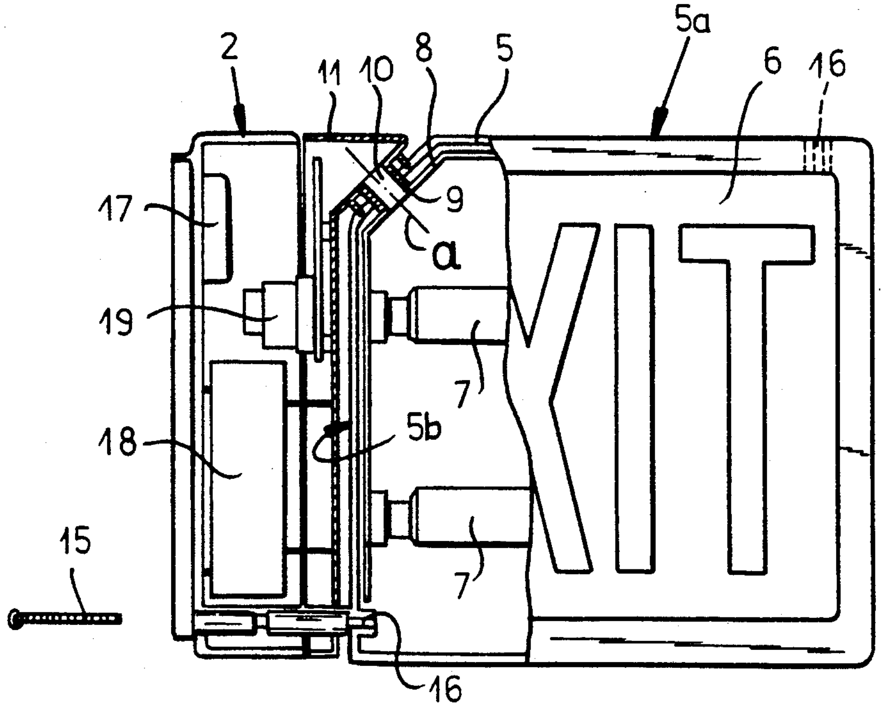
FIG. 4 is a partial cross-sectional front view of the sign assembly.

As will better be seen from FIGS. 4 and 5, sign body 1 substantially comprises a rectangular frame 5 to which are applied two lateral enclosing plates 6 of translucent material bearing the required writing or image, forming a box member, assembled with a base closure 6*a*. Within this box if desired, lamps 7 are located. The corresponding supply conductors, which are not illustrated can be also provided in the box.

Frame 5 has two faces 5*a*, 5*b* forming an angle of 90° between them. Between these faces a portion 8 lies which is bevelled at 45° with respect to the surfaces of the two faces 5*a*, 5*b* diverging at right angles.

On this bevelled portion 8 there is a seat 9 located perpendicular to the surface and capable of receiving a pin 10, about the axis a of which the sign body can rotate. The seat is integral with supporting member 2 and projects from a lateral portion 11 of the member, with an axis forming an angle of 45° with the mating surface of the supporting member and with wall 3 or ceiling 4.

Figure 3:
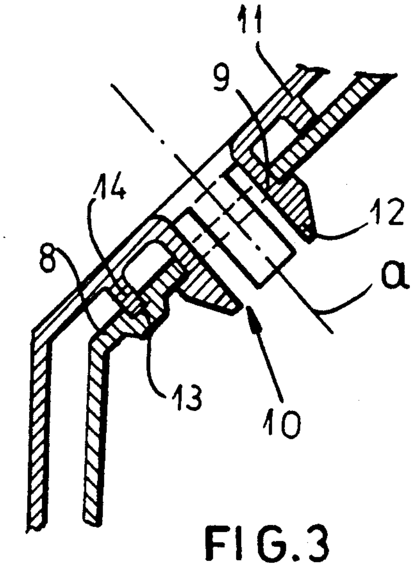
FIG. 3 is an enlarged cross-sectional view of hinge means according to FIG. 4.

As shown in FIG. 3, pin 10 conveniently comprises four elastic plates 12 forming an elastic collet projecting from portion 11 of the supporting member which is inserted and locked into seat 9 introduced into the sign body.

A groove 13 extending through an arc of 180° and centered on axis a is also present on the surface of bevel portion 8 and into this groove or pin 14 is inserted projecting from portion 11 of the supporting member, thus limiting the rotation of the sign body around pin 10 to 180°. Pin 14 may be held by a rebate or stop ensuring the final positions of the support member for the above purpose.

In a position hidden by portion 11 supporting member 2 is provided with a seat for a screw 15 which engages corresponding threaded holes 16 in faces 5*a* or 5*b* so that sign body 1 can be rigidly attached to the supporting member itself, thereby preventing relative rotation about pin 10. Supporting member 2 is attached to the structure supporting it, usually of masonry, by known means, such as plugs, hooks, screws, which are not shown, and may also be attached by means of a bracket, secured to the masonry, onto which member 2 can be clipped in a manner which is likewise known.

Within member 2 are also provided means for supplying lamps 7, if present, such as, terminal box 17, rechargeable batteries 18, electrical circuit 19.

In order to provide a supply to lamps 7 pin 10 is of the hollow type, offering a passage for communication between member 2 and sign 1 through which the corresponding electrical cables are passed.

With the structure so far described member 2 may then be rotated with respect to sign 6, as shown in FIGS. 1 and 2, about the axis a of pin 10, and can thereby be placed either alongside or above the latter thus permitting, alternatively, on a wall or mounting on a ceiling. In the preselected position, the supporting member and the sign body are therefore secured by a screw 15 engaging one of holes 16 in the sign body forming a rigid block with a support member.

Pin 10 may have shapes for example a threaded bush or tang, provided that the desired inclination to axis a around which relative rotation between the body and sign takes place is maintained. This pin may be blind if the sign is dark, but if the sign is illuminated the pin should be hollow, as stated above, to allow the supply cables to the lamps to pass therethrough.

The sign may consist of a true sign, that is bearing a drawing and descriptive writing, as shown by way of example in the appended figures, or of an advertising sign, or of an illumination device. In any event no special shape is required for the form of sign provided that there are two diverging faces joined by a portion having a flat surface lying at right angles to the bisector of the dihedral formed by the surfaces of the diverging faces and a rotation pin is inserted on the said bevel portion in order to attach the sign body to the supporting member, the lateral portion 11 of which should be complementary with the bevel side of the sign body.

I claim:

1. A sign assembly comprising:

a support member rotatable about a pivot axis between a first position and a second position thereof and provided with a first and second side formed with respective surfaces inclined to one another;

a prismatic sign body operatively connected with the supporting member, the sign body being formed with:

a front side and a top side formed with respective outer faces lying in respective first and second planes intersecting one another and forming a dihedral angel having a bisector, and a bevel side bridging the first and second sides and formed with a flat outer surface lying at a right angle to the bisector, the outer flat surface of the bevel side being complementary with the surface of the first side of the support member in the first and second positions thereof;

hinge means for rotatably connecting the support member and the sign body mounted on the first side of the support member and including a pivot member extending along the pivot axis perpendicular to the surfaces of the first side of the support member and of the bevel side of the sign body, the surface of the second side of the support member being complementary with the outer surface of the front side in the first position and with the outer surface of the top side in the second position of the support member; and fastening means for rigidly connecting the support member and the sign body in the first and second positions of the support member upon rotating thereof about the pivot axis.

2. The sign assembly defined in claim 1 wherein the bevel side and the first side of the support member are formed with respective holes coaxial with one another and receiving the pivot member, said sign body being formed with an interior, said pivot member being an elastic collet formed with a passage opening into the interior of the sign body.

3. The sign assembly defined in claim 1 wherein the hinge means further includes securing means for limiting relative rotation between the member and sign body to a predetermined angle between the first and second position equal at most to 180°.

4. The sign assembly defined in claim 1 wherein the top and front sides of the main body lie in mutually perpendicular planes.

* * * * *